J. G. LAWLER.
SIX WHEEL TRUCK.
APPLICATION FILED JAN. 24, 1910.
1,008,723.
Patented Nov. 14, 1911.
8 SHEETS—SHEET 2.
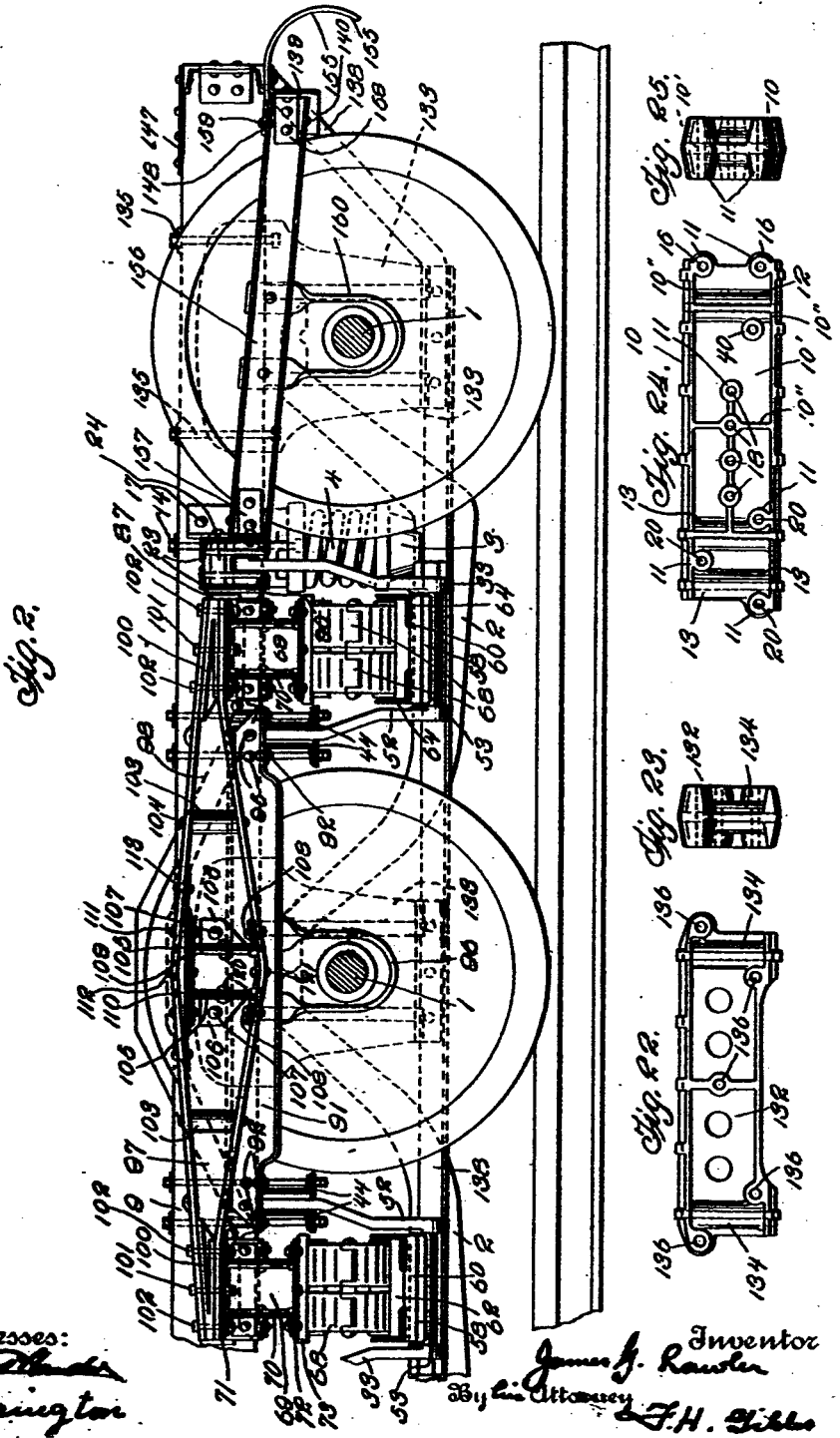

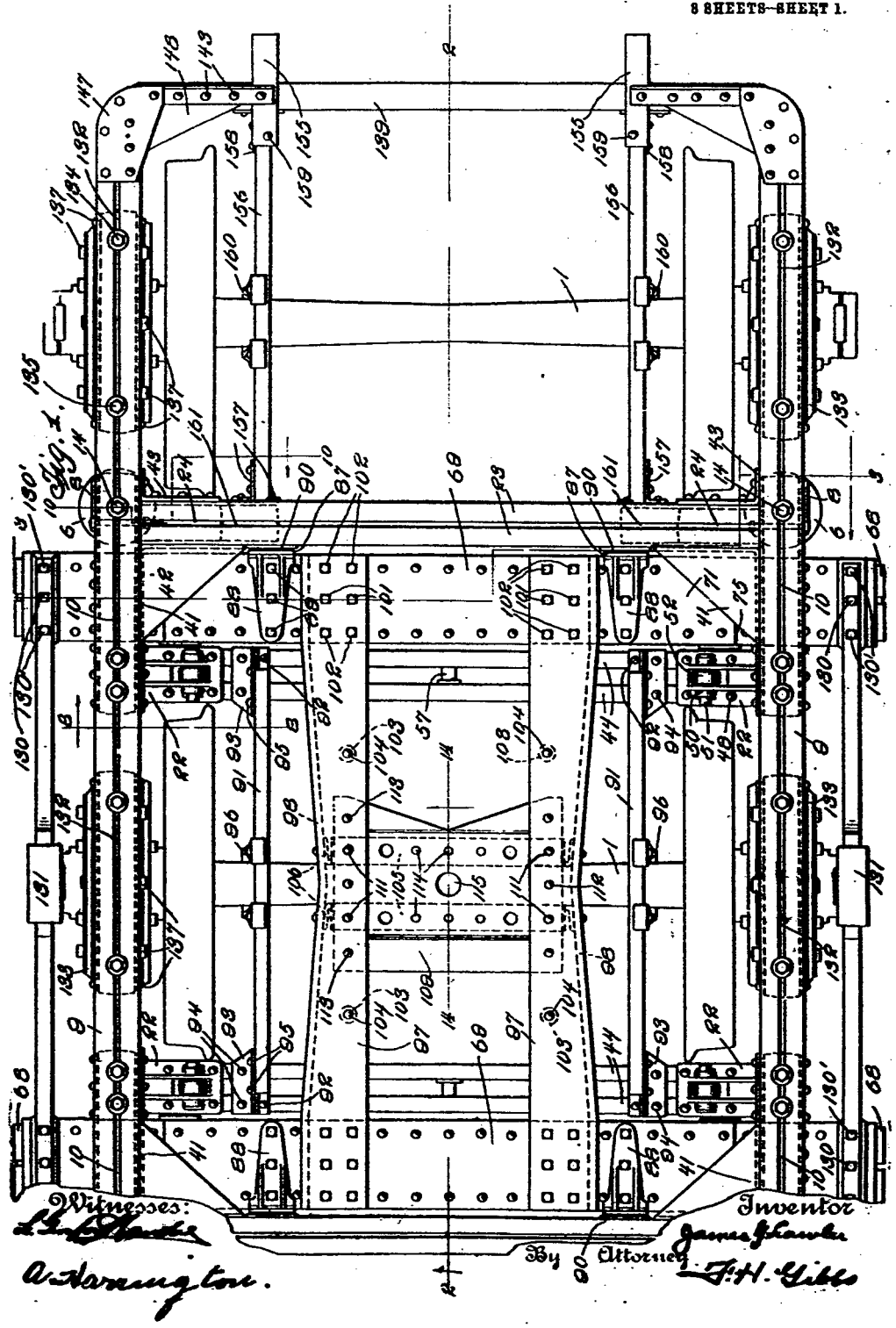

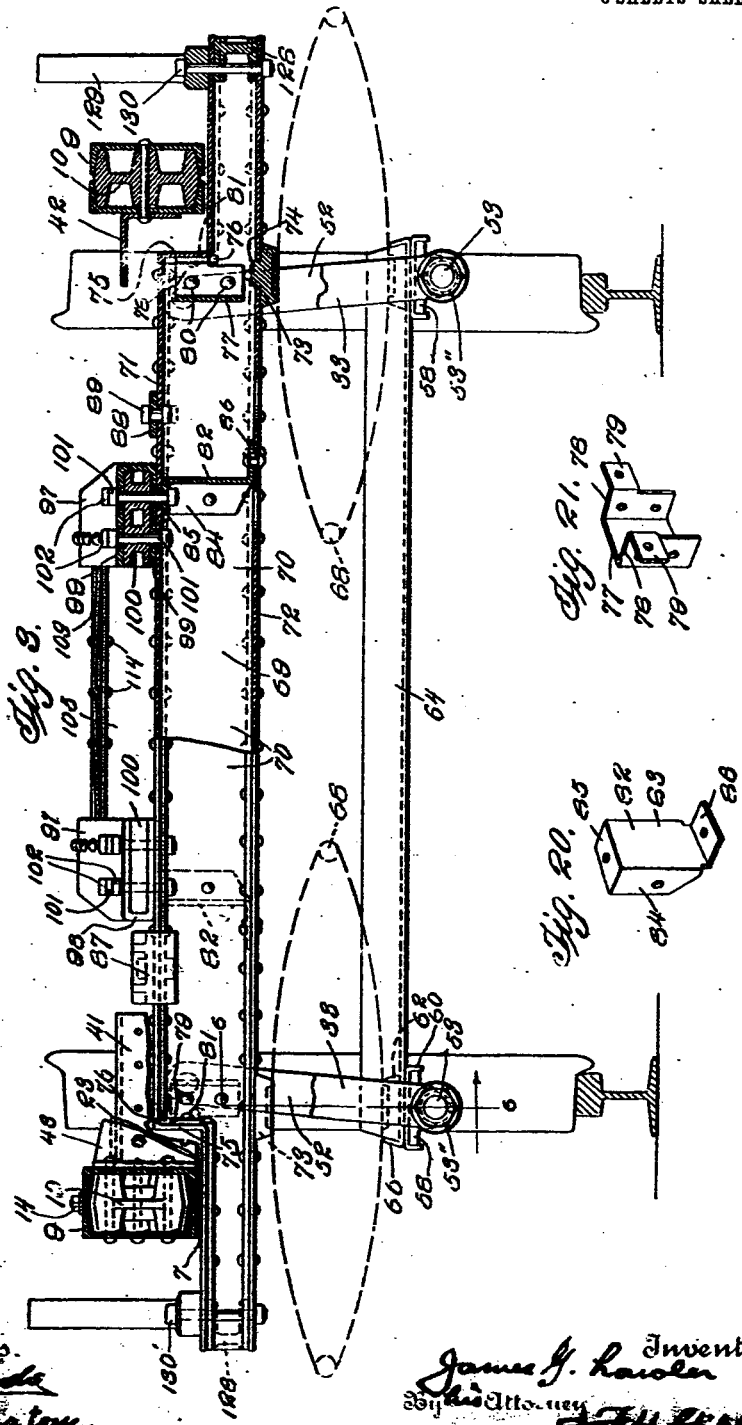

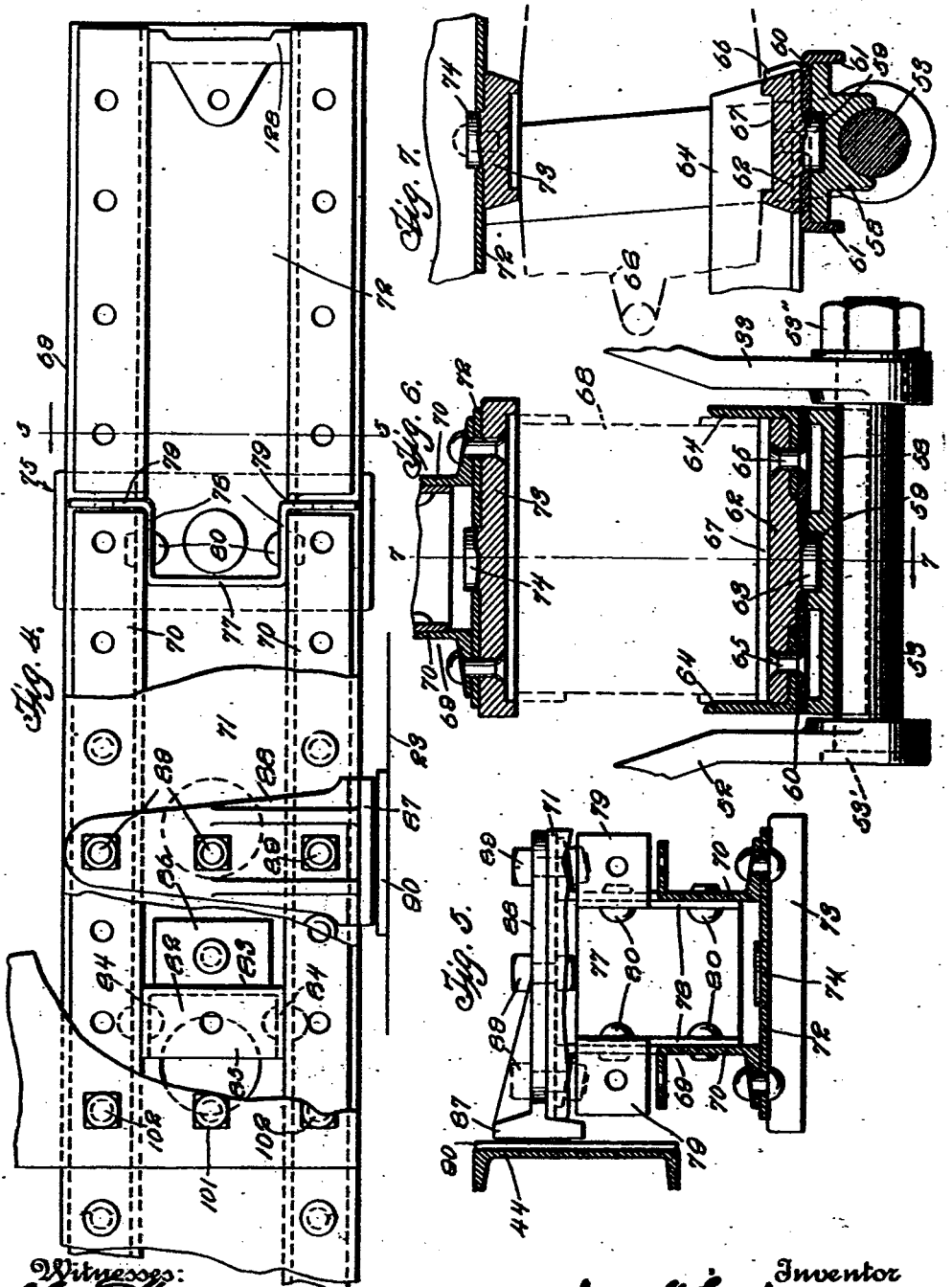

J. G. LAWLER.
SIX WHEEL TRUCK.
APPLICATION FILED JAN. 24, 1910.
1,008,723.
Patented Nov. 14, 1911
8 SHEETS—SHEET 5.
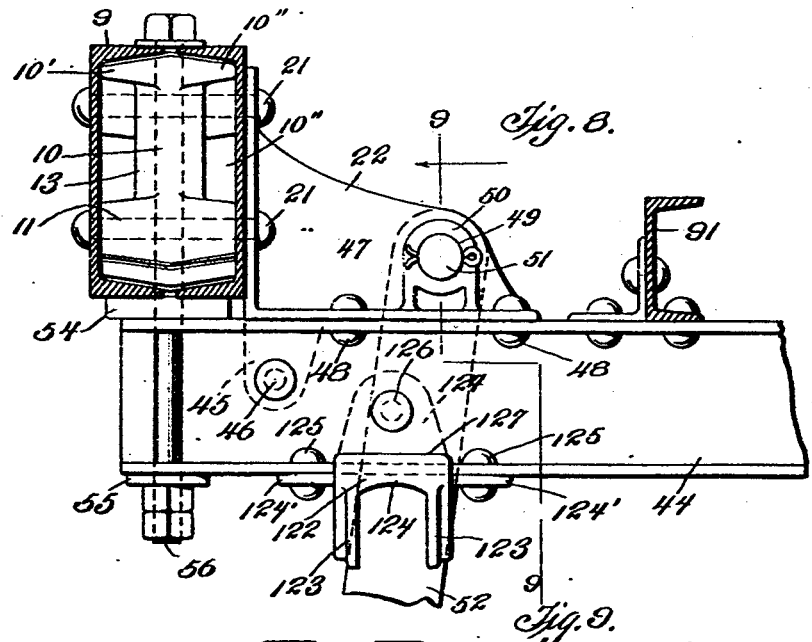
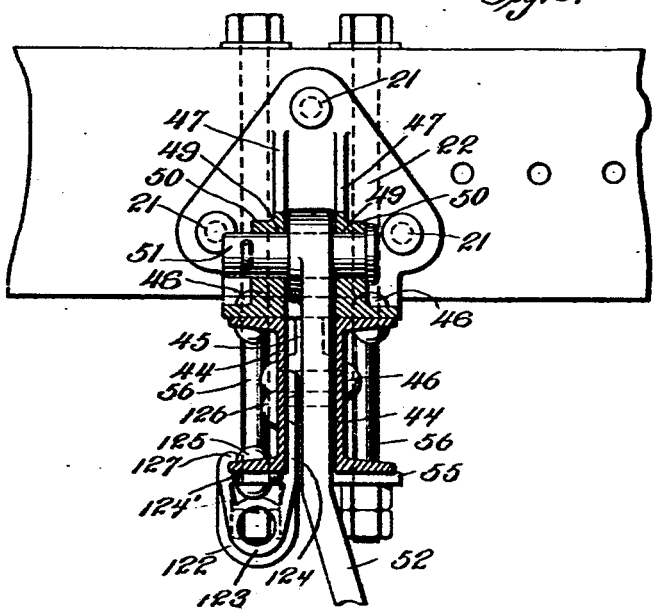

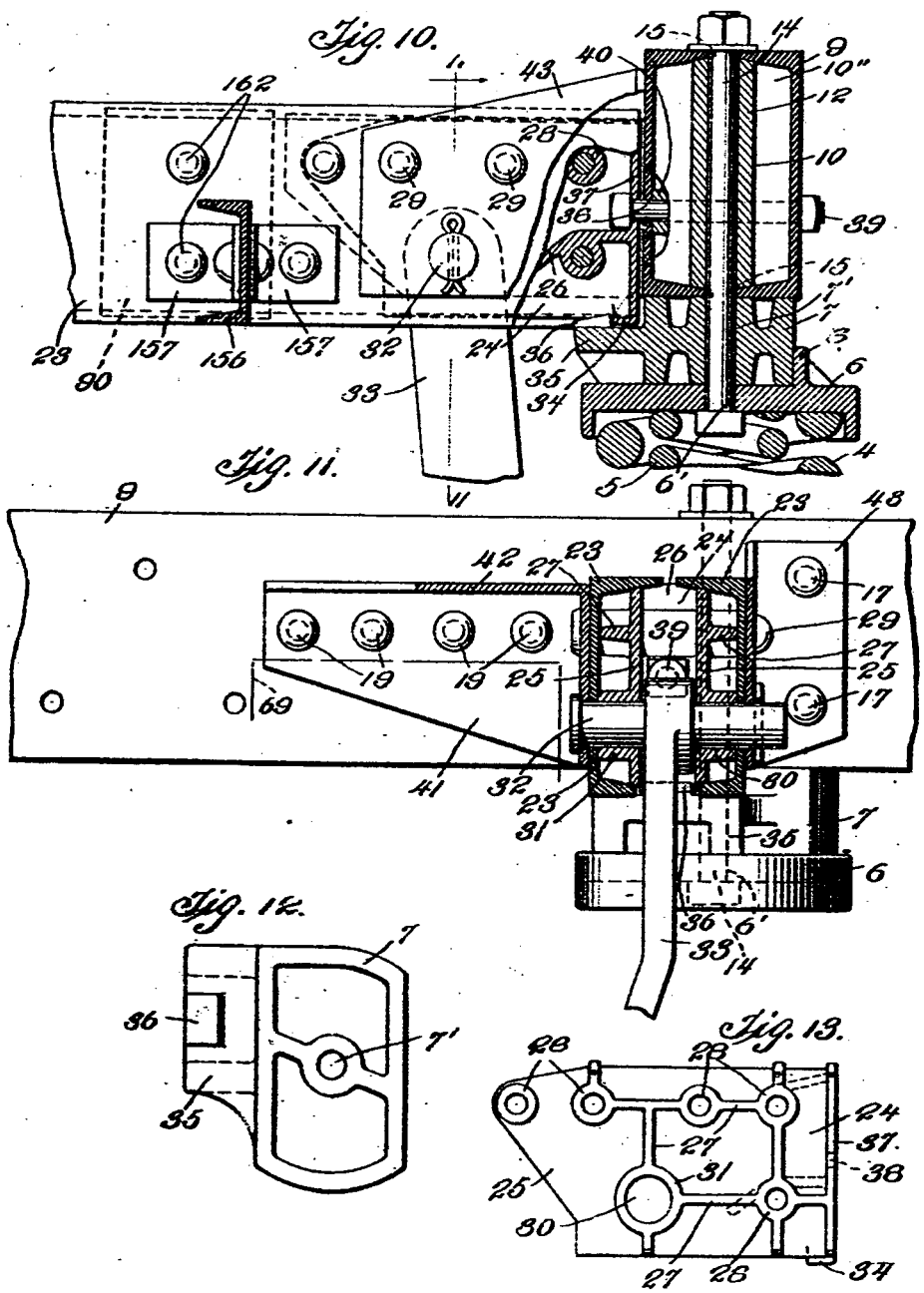

J. G. LAWLER.
SIX WHEEL TRUCK.
APPLICATION FILED JAN. 24, 1910.
1,008,723.
Patented Nov. 14, 1911.
8 SHEETS—SHEET 7.
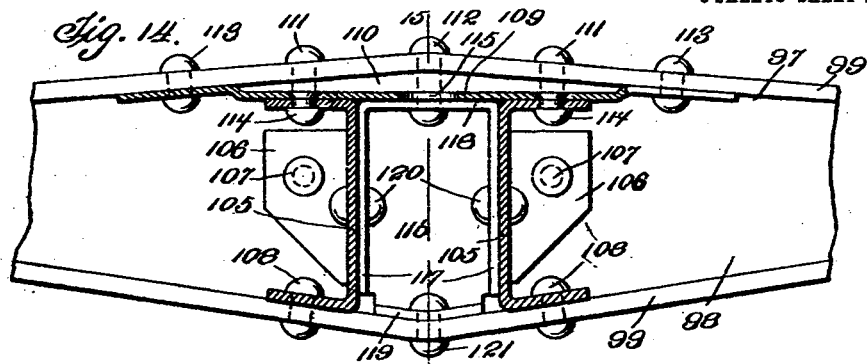
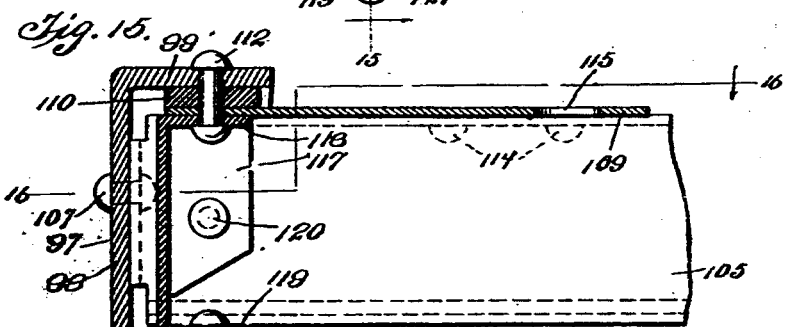
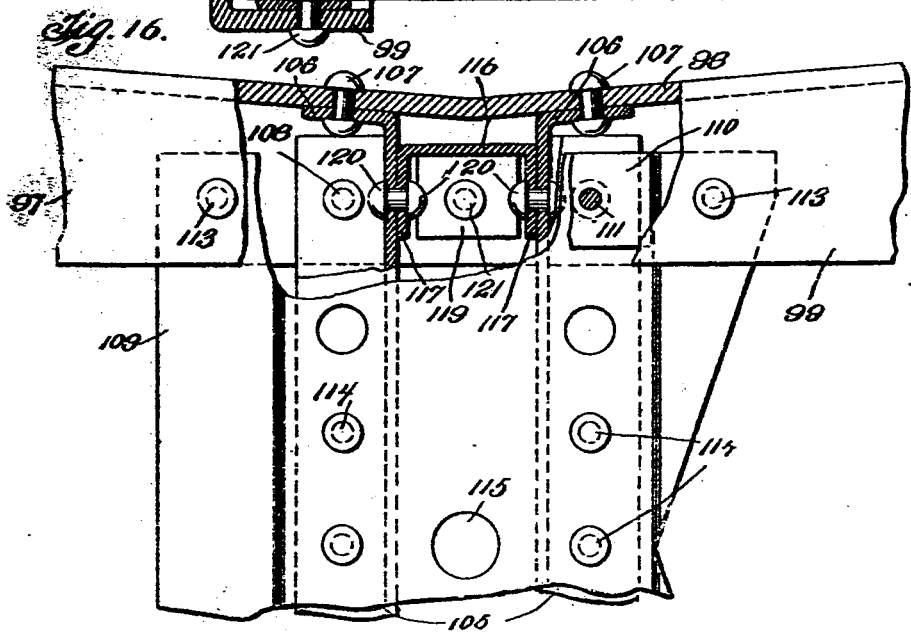

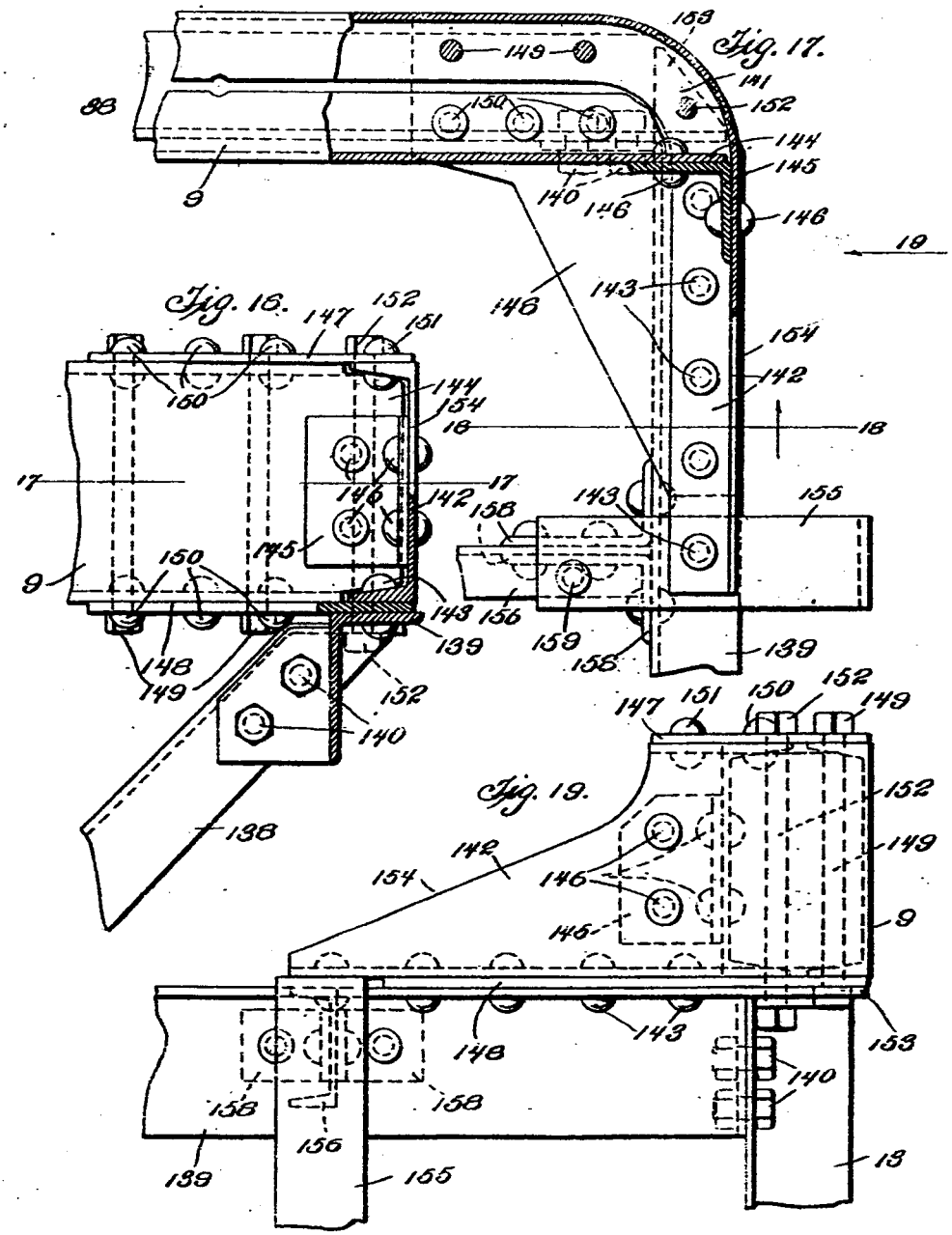

UNITED STATES PATENT OFFICE

JAMES G. LAWLER, OF ST. CHARLES, MISSOURI, ASSIGNOR TO AMERICAN CAR AND FOUNDRY COMPANY, OF ST. LOUIS, MISSOURI, A CORPORATION OF NEW JERSEY.

SIX-WHEEL TRUCK 1,008,723.     Specification of Letters Patent.     Patented Nov. 14, 1911.

Application filed January 24, 1910. Serial No. 539,871.

*To all whom it may concern:*

Be it known that I, JAMES G. LAWLER, residing at St. Charles, Missouri, and being a citizen of the United States, have invented certain new and useful Improvements in Six-Wheel Trucks, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In the accompanying drawings,—Figure 1 is a top plan view of a six-wheel truck embodying the features of the present invention, one end being broken away for the saving of space. Fig. 2 is a longitudinal, vertical, central section therethrough taken on the plane indicated by line 2, 2, of Fig. 1. Fig. 3 is a transverse, vertical section taken on the plane indicated by line 3, 3, of Fig. 1, and looking in the direction indicated by the arrow. Fig. 4 is a fragmentary plan view of one of the spring beams, the cover plate being indicated as removed for portions of the length of the beam for disclosing interior structure. Fig. 5 is a transverse, vertical section taken on the plane indicated by line 5, 5, of Fig. 4, one of the angles of one of the contiguous transoms being indicated in section. Fig. 6 is a transverse vertical section taken through one of the spring beams and spring plank therefor, on the plane indicated by line 6—6 of Fig. 3, looking in the direction indicated by the arrow, a fragment of the upper portion of the spring beam being broken away and the elliptical spring being indicated in dotted lines. Fig. 7 is a transverse, vertical section taken on the plane indicated by line 7, 7, of Fig. 6. Fig. 8 is a transverse, vertical section taken on the plane indicated by line 8, 8, of Fig. 1, and looking in the direction indicated by the arrow, a fragment of one of the intermediate transoms being indicated in side elevation. Fig. 9 is a vertical section taken on the plane indicated by line 9, 9, of Fig. 8. Fig. 10 is a vertical, transverse section taken on the plane indicated by line 10, 10 of Fig. 1, and looking in the direction indicated by the arrow, parts being broken away for disclosing interior structure. Fig. 11 is a vertical section taken on the plane indicated by line 11, 11, of Fig. 10, and looking in the direction indicated by the arrow. Fig. 12 is a detail top plan view of the side frame and transom supporting filler block. Fig. 13 is a view in side elevation of the intermediate transom filler block at the point of engagement with the side frame. Fig. 14 is an enlarged detail fragmentary vertical section taken on the plane indicated by line 14, 14, of Fig. 1, and looking in the direction indicated by the arrow. Fig. 15 is a vertical, transverse section taken on the plane indicated by line 15, 15, of Fig. 14, and looking in the direction indicated by the arrow. Fig. 16 is a view partly in horizontal section on the plane indicated by line 16, 16, of Fig. 15, looking downwardly, part being seen in top plan. Fig. 17 is an enlarged detail fragmentary view partly in horizontal section and partly in top plan of one corner of the truck frame. Fig. 18 is a vertical section taken on the plane indicated by line 18, 18, of Fig. 17, and looking in the direction indicated by the arrow. Fig. 19 is a view in end elevation taken from the plane of observation indicated by arrow 19 of Fig. 17. Fig. 20 is a detail perspective of one of the filler block pressings beneath the terminals of the center beam or bolster. Fig. 21 is a similar view of one of the intermediate filler block pressings for the spring beam. Figs. 22 and 23 are detail views in side and end elevation respectively of one of the side frame filler blocks for the pedestals. Figs. 24 and 25 are similar views of one of the side frame filler blocks for the transoms.

Referring to the drawings by numerals, 1, 1, indicate the usual axles whose bearing boxes sustain the usual equalizer bars 2, 2, there being at each side of the truck an equalizer bar extending from the bearing box of each outer axle to the bearing box of the intermediate axle, and each of said equalizer bars being provided with a spring seat 3 at its outer portion. In each seat 3 is mounted a side frame sustaining spring 4 inclosing a similarly functioned spring 5. Each set of springs 4 and 5 is inclosed at the upper end by a cap 6 upon which is mounted a side frame and transom supporting filler block 7 limited against outward play by an upstanding flange 8 formed integral with cap 6. Obviously, flange 8 in a converse sense serves to obviate inward play of the cap. As there is a set of springs 4 and 5 for the outer end of each equalizer bar 2, there are consequently four blocks 7 two at each side, upon which the side frames 9, 9 rest. Each side frame consists of a pair of channel beams with facing flanges, the inner edges of the horizontal flanges of said beams being spaced to accommodate bolts as hereinafter specified. A filler block 10 is arranged between the channels of each frame 9 immediately above each block 7, and each of said filler blocks is formed of a central web 10' flanged laterally as at 10" to snugly fit the inner surfaces of the channels, said flange 10" being formed at various points into bosses 11 surrounding the several transverse bolt receiving apertures in the web 10'. At one end of filler 10 the same is formed with a vertical sleeve 12, and at the other end with a pair of similar sleeves 13. Each cap 6 is apertured centrally, as at 6', and in vertical alinement with said aperture the block 7 is formed with apertures 7', and sleeve 12 is in turn arranged with its bore in vertical alinement with aperture 7, and a retaining bolt 14 extends throughout all of the registering openings and between the flanges of the channels of the respective side frame 9, said flanges being notched as at 15 for accommodating the respective bolts. Said bolt 14 is headed at its lower end and provided with a suitable washer and nut at its upper end for firmly binding the parts together. Filler block 10 is formed at its outer end with bolt receiving apertures 16, 16, just outside sleeve 12 through which are passed the retaining rivets 17, 17, extending through the webs of both channels of the respective side frame 9. Each filler block 10 extends from sleeve 12 along the respective side frame inwardly, that is, toward the middle of the side frame, a distance sufficient for accommodating the parts hereinafter specified, the web of the filler block being formed with a series of apertures 18 extending from an intermediate point toward the inner end of the filler and adapted to receive binding rivets 19, 19, passed through the webs of the side-frame channels for aiding in the distribution of strains from the inner end of the filler block to the supporting block 7. Filler block 10 is formed contiguous to its inner end with a set of transverse apertures 20, 20, engaged by the retaining rivets 21 extending through the webs of the channel beams of the respective side frame and engaging casting 22.

A pair of transoms is provided between the intermediate axle and each outer axle, and one pair is sustained by the side frames 9, at the points of a set of the blocks 10, and the other pair of transoms is sustained by the side frames at the points of the other set of filler blocks 10. As one set of transoms with the interposed spring beam and connected parts are duplicates of the transoms and other parts of the other set, one set only will be specifically described and the reference numerals will equally apply to both. Each of said sets of transoms consists of a higher transom and a lower transom, the detail construction of the higher transom being seen in Figs. 10, 11 and 13, and of the lower transom in Figs. 8 and 9. The higher transom is so-called and distinguished from the lower transom in that the ends of the lower transom extend beneath the side frames and the upper surface of the lower transom is in substantially the same plane as the lower edges of the side frames, whereas the upper transom abuts against the sides of the side frames and has its lower edge lying only slightly beneath the lower edges of the side frames. The higher transom consists of a pair of facing channel beams, 23, provided at each end with an interposed filler block, 24. Each block, 24, is formed of a pair of spaced webs, 25, extending longitudinally of the channel beams and spaced by cross webs, 26, outstanding flanges, 27, being formed integral with the respective webs, 25, and extending out to the respective webs of channel beams, 23. The filler block, 24, is also formed with transverse sleeves, 28, 28, through which are passed the retaining and connecting rivets, 29, extending through the webs of channels, 23. Each web, 25, is formed with an enlarged aperture, 30, surrounded by an outstanding boss, 31, and registering with a corresponding aperture in the webs of beam, 23, for the reception of the hanger pin, 32, which pivotally sustains a hanger link, 33, of the spring plank. The lower edge of filler block, 24, at its outer end is formed with a shoulder or depending lug, 34.

The respective contiguous block, 7, is formed with an inwardly extending flange or web, 35, having an upstanding lug, 36, the said web extending from an intermediate portion in the vertical thickness of block, 7. The lug, 34, extending downwardly from block 24, laps lug 36, as clearly seen in Fig. 10, so as to prevent any longitudinal movement of the transom or lateral movement of the side frame. The outer end of block, 24 is closed by a transverse web, 37, the lower inwardly turned terminus of which may constitute lug 34, and at an intermediate point web 37 is apertured, as at 38, for the reception of a bolt, 39, which extends through said aperture and through suitable apertures in the channels of side frames, 9, and in the filler block, 10, said filler block being formed with a transverse sleeve, 40, for accommodating said bolt. As a further means of connection between each end of each higher transom and the respective side frame an angle pressing, 41, is fitted in the corner between the web of the inner channel, 23, and the web of the inner channel of the respective side frame, said pressing having the bracing gusset, 42, and being engaged and retained by the rivets, 19, and 29, engaging the vertical webs of the pressing. The opposite side of the transom is connected to the side frame by an angle plate, 43, whose webs are engaged respectively by rivets, 17, and 29. The vertical webs of members, 41 and 43, which engage the transom, are preferably apertured as indicated for accommodating pin, 32.

It is to be observed that the vertical stresses transmitted through the higher transoms are taken up directly by the equalizer springs, whereas those transmitted by the lower transom must be carried by the side frames and the filler blocks, 10. Each lower transom comprises a pair of channel bars, 44, with oppositely disposed flanges, and the webs spaced apart. To aid in maintaining the space between beams, 44, each casting, 22, is provided with a depending lug, 45, which fits snugly between the beams at the respective ends and is secured thereto by a rivet, 46, extending through the webs of beams, 44, and through the lug, 45. Each casting, 22, is formed with a pair of parallel vertical webs, 47, spaced apart substantially in vertical alinement with the webs of the respective beams, 44, each web, 47, having its lower edge resting upon the upper flange of the respective beam, 44, and the casting, 22, having outstanding horizontal flanges from the lower edges of webs, 47, secured by rivets, 48, 48, to the upper flange of the respective beam, 44. Each web, 47, is apertured near its inner end, as at 49, and provided with an outstanding annular boss, 50, surrounding said aperture, the said bosses and walls of the apertures forming bearings for the pivot pin, 51, of the spring plank link, or hanger, 52, which is the complement of hanger, 33. Hanger, 52, extends from pin, 51 downwardly between webs 47, and between the webs of beams, 44, and is spaced a sufficient distance inwardly from lug, 45, to be free to swing edgewise between the said webs. The lower ends of hangers, 33, and 52, are connected by the spring plank supporting pin or bolt, 53, having a countersunk head, 53' at one end and the retaining nut, 53", at the other end, an intervening washer being preferably employed between the nut, 53", and the lower end of hanger, 33. As a means of obviating excessive length of pin, 53, and to enable reduction of the same to substantially the equivalent of the width of the spring plank, the hangers 52 and 33 are bent at their upper ends just beneath the respective transom and inclined toward each other down to a point just above the pin 53, and there again bent into a vertical portion. The channel beams 44 extend outwardly beyond castings 22, and at their ends underhang side frames 9, a filler block 54 being interposed between each side frame and the respective underhanging ends of beams 44. A flat 55 is arranged beneath and extends across the channels 44 at each end thereof, and a pair of bolts 56 extends through the respective side frame 9, the filler block 54, the flanges of channel beams 44, and the flat 55 near the ends thereof. Each bolt 56 extends through one of the sleeves 13, and between the flanges of the channel beams comprising the respective side frame 9, said flanges being notched for accommodating the bolt. The lower transom is thus suspended from the side frames by bolts 55 in addition to their connection therewith through casting 22. As a further stiffening and spacing means for beams 44, a spacing filler 57 may be provided intermediate the length of the transom.

Journaled on each pin 53 is a bearing block 58 which extends substantially throughout the length of the pin between hangers 52 and 33, there being of course a set of said hangers at each end of each pair of transoms. Block 58 is preferably formed of a casting having a semi-circular longitudinal groove snugly fitting pin 53, the upper face of the block being provided with a central recess 59, and if preferred with lateral recesses for reducing the weight of the block. Lying upon the upper face of the block is a cover plate or cap 60 having downwardly turned flanges 61, 61, overhanging the edges of block 58, the plate 60 being formed with a central aperture registering with recess 59. A seat 62 for the elliptic spring is mounted on plate 60 and is provided with a depending, central lug 63 extending through the aperture in the center of plate 60 and down into the recess 59 of block 58. The spring plank proper comprises a pair of spaced angles 64, 64, with the horizontal flange of each extending toward the other, and the horizontal flange of each of said angles 64 lies flat against the upper face of plate 60, a portion of the under face of block 62 at each end thereof being cut-away to accommodate said flange. Each of said horizontal flanges, seat 62 and plate 60 are firmly secured together by rivets 65. Each of said horizontal flanges of angles 64 extends beyond seat 62 and is upturned as at 66 against the outer edge of the seat for firmly retaining the same against outward displacement. Seat 62 is formed with a suitable groove 67 for the accommodation of the usual band for the elliptic spring. As there is of course a seat block 62 at each end of the spring plank which is rigidly connected by rivets 65 to the angles making up said spring plank, the spring plank structure as an entirety may be lifted from or positioned on the bearing blocks 58 with facility, and when positioned the parts are efficiently retained by the construction of plate 60 against displacement. Mounted on the spring seat block 62 are the usual double elliptical springs 68 upon which is mounted the bolster, 69. Bolster 69, comprises a pair of channel beams 70 having their channels opening away from each other and their webs spaced apart, the channels of the bolster being connected by an upper cover plate 71 and a lower cover plate 72, both said cover plates being riveted throughout their length to the respective flanges of the channels. An upper spring seat block, 73, is preferably arranged near each end of the said bolsters, and each is provided with an upstanding retaining lug, 74, extending through the cover plate, 72, the under face of each block, 73, being recessed to receive the elliptical spring bands. Each of the bolsters, 70, is cut-away at each end for approximately one-half of its vertical width, and the narrower portion flanged in exactly the same manner as the main portion, the cover plate, 71, extending throughout the length of all portions of said bolsters, being bent downwardly at 75, 75, for covering the shoulders at the terminals of the deeper portion of said bolsters, each of said shoulders being spaced from the respective side frame 9 a distance slightly greater than the distance of longitudinal swing of the said spring bolsters in operation. Each of the downwardly bent portions, 75, is spaced a short distance from the respective shoulder leaving a vertical slot, 76, between said shoulder and the portion, 75. For strengthening and stiffening the parts a filler is interposed between the channels of bolsters, 70, at the point of each of the shoulders thereof, said filler comprising a pressing of substantially the form indicated in Fig. 21, comprising a cross flange, or web, 77, extending from one channel 70, to the other, lateral flanges, 78, 78, and outstanding flanges, 79, 79, the flanges, 78, fitting snugly against the inner faces of the webs of said channels, 70, and being secured thereto by rivets, 80, 80, and the outstanding flanges, 79, projecting through the slots, 76, and being attached to the downwardly bent portion 75, of cover plate, 71, by rivets, 81. Intermediate the length of said bolsters, 69, are disposed filler blocks, or pressings, 82, 82, each comprising a cross web, 83, extending from the web of one channel 70 to the web of the other, side flanges, 84, 84, a top flange, 85, and a bottom flange, 86, the bottom flange being riveted to the bottom cover plate, 72, and the side flanges to the webs of the channel beams, 70.

As is usual in six wheel trucks, the two spring bolsters are spaced apart and the center bearing plate (not shown) is supported by a center bearing arch or bridge connecting the two bolsters and joined intermediate its length by a suitable short bolster, extending from said center bearing arch members under the center bearing supporting plate, the whole comprising a double truck bolster. Each of said spring bolsters is provided with a pair of outwardly facing wearing plates, 87, formed integral with casting, 88, which casting extends inwardly across the top of center plate, 71, and is bolted thereto, as at 89.

Opposite each plate, 87, is a complemental plate, 90, carried by the respective outer or higher transom. It is to be noted that the lower transoms are the intermediate transoms and are connected together at each end by a longitudinally disposed channel tie, or safety hanger beam, 91, having its lower flange riveted, as at 92, 92, to the upper flanges of beams, 44, each end of each beam, 91, being also connected to the respective transom by the angle plate, 93, having its horizontal flange riveted, as at 94, to the upper flanges of beams, 44, and having its vertical flange riveted as at 95 to the web of beams, 91. Depending from each beam, 91, is the safety hanger yoke, 96, surrounding the intermediate axle, 1.

The double truck bolster arch connecting the spring bolsters comprises a pair of substantially parallel channel arch beams, 97, and a short bolster connecting said arch beams, 97, midway of their length. Each of said arch beams, 97, comprises a relatively deep channel whose web, 98, is widest midway of its length and tapers throughout its length in opposite directions to its ends, the flanges, 99, of said arch beam, 97, being inversely tapered, that is to say, being widest at their ends and tapering to their middle, the half of web, 98, at one side of the middle of the beam being disposed at an angle to the portion of the web at the other side, as clearly seen in Figs. 1 and 16. Each end of each arch beam 97 is provided with a filler block, 100, fitting snugly between flanges 99, and extending for the full width of the respective spring bolsters, 69. A pair of bolts, 101 extends through each end of each beam, 97, and through the cover plate, 71, of the said bolsters, 69, one of said bolts of each pair also extending through the top flange, 85, of filler pressing, 82, there being one pressing, 82, beneath each end of each of said arch beams, 97. Each end of each of said beams is also connected to the respective spring bolster by bolts, 102, 102, extending through the respective beam, 97, and its filler block and through the top cover plate and upper flanges of the respective spring bolster. At an intermediate point between each filler block, 100, and the middle of each beam, 97, said beam is provided with a filler sleeve, 103, snugly fitted between flanges, 97, and each retained in position by a rivet, 104, extending through and connecting said flanges.

Midway of the length of the arch beams, 97, the said beams are connected by the short bolster comprising a pair of channel beams, 105, having their flanges oppositely disposed and their webs spaced apart, a portion of the end of the web of each channel being bent at right angles, as at 106, and riveted as at 107 to the web 98, of the respective arch beams, 97, the flanges of channels 105 being cut-away for permitting the outward bending or turning of the portions 106. The lower flange of each channel 105 is riveted, as at 108, to the lower flange 99 of the respective arch beam 97. A cover plate 109 is positioned upon and riveted to the upper flanges of the channels 105, and the said cover plate extends beneath the upper flanges 99 of the arch beams 97, a filler block 110 being interposed between the cover plate 109 and the respective upper flange 99. The said flange 99, filler block 110, and cover plate 109 are secured together by rivets 111 which also engage the upper flanges of the channels, 105. Each end of the cover plate 109 with the respective filler block 110 is also secured to the upper flange 99 of the respective arch beam 97 by rivet 112. Cover plate 109 has its edges extending beyond the end of the filler blocks 110, and rivets 113, 113 are passed through the respective upper flange 99 and end of cover plate 109 beyond the respective filler block. Cover plate 109 is also secured throughout its length by rivets 114, 114, to the upper flanges of channel 105. The edge contour of cover plate 109 is preferably as indicated but may obviously be varied if desired for accommodating the sub-structure of the superposed car body. The usual king pin opening 115 is formed midway of the length of cover plate 109. At each end of the pair of channels 105, the parts are strengthened and stiffened by a filler block comprising a pressing having a cross web portion 116 extending from the web of one channel 105 to the web of the other, and also extending from the lower flange 99 to the cover plate 109, and having side flanges 117, a top flange 118, and a bottom flange 119. The side flanges 117 are riveted, as at 120, to the webs of channels 105 and the top flange 118 is engaged by rivet 112, while the bottom flange 119 is connected by rivet 121 to the bottom flange 99 of the respective beam 97.

As shown in Figs. 8 and 9, a brake hanger bearing is provided at each end of each of the intermediate or lower transoms and comprises a casting 122, formed with the depending journal bearings 123 pendant from an angle web 124, one portion of the web lying flat against the under face of the lower flange of inner beam, 44, and the upstanding portion of said web extending between the web of said beams 44 and lying flat against the face of the web of said beam 44. The horizontal and vertical portions of web 124 are respectively secured by rivets 125, and 126, to the flange and web of the inner beam 44. Lateral ears 124' are formed to take the rivets 125. Upstanding from the exposed edge of the horizontal portion of flange 124 is a hook 127 which overlaps and snugly engages the edge of the lower flange of said beam 44. The casting 122 may be positioned by any preferred manipulation of the parts, but is preferably slid onto beam 44 longitudinally thereof before the assemblage of said beam with the other parts.

The outer end of each reduced portion of each spring beam 69 is provided with a filler block 128 snugly fitting between the webs of channels 70 and the cover plates 71 and 72. A side bearing 129 is arranged at each side of the truck, and each has its ends resting upon the respective ends of the reduced portions of the spring bolster, each end of each side bearing 129 being retained in position by a bolt 130 extending through the respective end of the side bearing and the reduced portion of the spring bolster and the corresponding filler block, 128, and also by bolts 130' extending through the end of the side bearing 129 and through the flanges of the respective channels 70 of the spring bolster. Each side bearing 129 may be provided with any preferred adaptation of bearing plate 131.

Above each axle 1 each side frame 9 is provided with a filler block, 132, seen in detail in Figs. 22 and 23. each of said filler blocks being of a length just sufficient for accommodating the usual pedestals, 133, and being provided with vertical sleeves, 134, 134, through which extend bolts, 135, 135, passing between the flanges of the channels comprising the side frames and extending down into supporting engagement with the pedestals, 132. Each filler block, 132 is made up of any desired form of body adapted to be snugly inclosed by and to fill the space between the channels of the respective side frame, but consisting preferably of a central vertical web with suitable outstanding or cross webs, both vertical and horizontal. The block is also provided with transverse or horizontal sleeves, 136, 136, adapted to accommodate bolts 137. The bolts 137 extend through the block and through the webs of the channels of the respective side frame and engage the upper portion of the respective pedestals, so as to bind all firmly together. The lower ends of all of the pedestals, 133, at each side are connected by the usual pedestal strap or truss rod 138 connected at its ends to the ends of the respective side frame. The side frames are connected at their ends by end frames, 139. each comprising angles with their horizontal webs uppermost and their vertical pendant web bent inwardly at each end and bolted, as at 140, to the flanges of the pedestal tie rods, 138, the said tie rods being preferably in the form of angle bars. The outer channel of each side frame is bent or rounded at its end, as at 141, into a lapping portion 142, overlapping and extending parallel with and secured by rivets, 143, 143, to the horizontal flange of the respective end frame, 139, the rivets, 143, being passed through the lower flange of the respective channel beam. The inner channel of each side frame has its flanges cut away for accommodating the flanges of the respective outer channel, the web of the inner channel extending at each end between the flanges of the lapping portion of the outer channel as indicated at 144; see Figs. 17 and 18. A vertically disposed angle piece or corner bracket 145 is fitted in the corner produced by the right angular relation of the extended portion 144, with the web of the lapping portion 142, and is secured to said portions by rivets 146, 146. Top and bottom gusset plates 147 and 148 are arranged respectively above and below the channels of each side frame at each terminal thereof, plate 147 being relatively smaller than plate 148 and both of said plates being bolted by bolts, 149, 149, to the flanges of the outer channel beam, and riveted as at 150, 150, to the flanges of the inner channel, and plate 147 is also riveted at 151 to the upper flange of the lapping portion 142. The plate 148 is interposed between the lower flange of the lapping portion 142 and the horizontal web of the truck end piece, so that said plate is engaged by rivets 143. The parts are also connected by a bolt 152 through plate 147, the flanges of the rounded corner 141 of the outer channel beam, the plate 148, an extension 153, of the horizontal flange of end piece 139, and a horizontal portion of one of the webs of tie rod 138. It is noted that the end piece 139 has its vertical web bent at each end and connected with tie rods or tie pieces 138 as above described, thus leaving at each end the portion 153 of the horizontal flange extending across and above the respective tie pieces 138. Preferably, the web of the lapping portion 142 is cut away, as at 154, for a portion of its length and inclined from the upper edge to its terminus, the said terminus of the lapping portion 142 overlapping the usual brake release spring 155, which is retained by one of the rivets 143. Engaging each end piece 139 at the point of each spring 155 is a longitudinally disposed channel safety beam 156 which extends to the respective outer or higher transom, and is connected to the outer channel beam thereof by suitably riveted corner brackets, 157, 157. The outer end of each beam 156 is similarly connected by corner brackets 158, 158, to the vertical web of the respective end frame, 139. The inner end of each spring 155 is preferably riveted, as at 159 to the upper flange of the respective beam 156, which while primarily affording a means of connection for the spring also serves as a stiffening and supporting means in the connection of the beam 156. Each safety beam 156 is provided intermediate its length with a depending safety yoke hanger 160 surrounding the respective axle 1. Between the channels 23 of each of the higher transoms at each end thereof, immediately opposite the point of engagement of the inner end of the respective safety beam 156, is arranged a filler block 161, each of which filler blocks is shaped to snugly fit between the webs of the respective pair of channels 23 similarly, as shown and described for the filler blocks, 24, and is retained in position by rivets 162, which rivets also serve to connect the respective wear plate, 90, to the inner channel, 23. Each of said filler blocks, as is seen in Fig. 1, is arranged opposite the respective wear plate, 90, so that stresses transmitted to the respective transom from lateral thrusts of the spring bolster through wear plates 87 will be transmitted to the end frame as well as to the side frames. Undue stress or excessive vibration at any given point is thus largely obviated.

What I claim is:—

1. In a truck, the combination with side and end frames, of spaced transoms, a spring bolster contiguous to each transom, wear plate castings extending transversely of and mounted on the spring bolsters and having wear plates facing toward the transoms, complemental wear plates on the transoms, and means connecting the spring bolsters together.

2. In a truck, the combination with side and end frames, of a pair of spaced beams comprising a transom connecting the side frames, a filler block between said transom beams, a tie beam extending from the transom to one of the end pieces and engaging the transom substantially at the point of the filler block, a spring bolster contiguous to the transom at the opposite side from the tie beam, a wear plate on said transom substantially at the point of the filler block, and a coöperating wear plate on the spring bolster.

3. In a truck, the combination of spaced spring bolsters, center bearing arch bars, and a short bolster connecting the same, said arch bars tapering from their ends toward an intermediate point, and the short bolster engaging and sustained by said intermediate point.

4. In a truck, the combination of a pair of spaced spring bolsters, and bolster arch bars, connecting said bolsters, and comprising a pair of beams each tapered horizontally toward an intermediate point and flared vertically toward said intermediate point, and a short bolster connecting said beams at said intermediate point.

5. In a truck, the combination of a pair of spaced spring bolsters, and bolster arch bars connecting the same and comprising a pair of connecting beams, and a short bolster connecting said connecting beams at an intermediate point, each of the connecting beams comprising a channel having flanges tapering toward said intermediate point, and a web tapering in opposite directions from said intermediate point.

6. In a truck, the combination of a pair of spaced spring bolsters, a pair of connecting arch beams connecting said spring bolsters, and a short bolster connecting the arch beams at an intermediate point and sustained thereby, each of the connecting beams comprising a channel having flanges tapering in one direction, and a web tapering in the other direction.

7. In a truck, the combination of a pair of spaced spring bolsters, a pair of connecting arch beams connecting said spring bolsters, and a short bolster sustained by said arch beams, at an intermediate point, each arch beam comprising a channel having flanges tapering in opposite directions with respect to said intermediate point, and an inversely tapered web.

8. In a truck, the combination of a pair of spaced spring bolsters, a pair of connecting arch beams connecting said spring bolsters, a short bolster engaging and sustained by said arch beams at an intermediate point in the length thereof, each of said beams comprising a channel having flanges tapering toward said intermediate point, and a web tapering in opposite directions from said intermediate point, and a filler block disposed between the flanges at each end of each connecting beam.

9. In a truck, the combination of a pair of spaced spring bolsters, a pair of connecting arch beams therefor, a bolster sustained by said arch beams at an intermediate point, each arch beam comprising a channel having flanges tapering toward said intermediate point, and a web tapering away from the intermediate point, the ends of each of said arch beams resting upon and extending across said spring bolsters, a filler block arranged between the flanges at each end of each arch bear, each of said filler blocks fitting snugly between said flanges and extending across the respective spring bolster, and means connecting the ends of said arch beams and the filler blocks to the spring bolsters.

10. In a truck, the combination of a pair of spaced spring bolsters, channel arch beams connecting said spring bolsters, and a short bolster connecting said channel beams and comprising a pair of channels having their webs connected to the webs of the first-mentioned channel arch beams, and a cover plate for the second-mentioned channels.

11. In a truck, the combination with a pair of spaced spring bolsters, and arch bars, connecting the same, comprising a pair of channel beams connected to said spring bolsters and opening toward each other, a pair of cross channels connecting said arch bars, and extending between the flanges thereof, and a cover plate for said second-mentioned channel beams.

12. In a truck, the combination with a pair of spring bolsters, of arch beams, connecting said spring bolsters and comprising a pair of channel beams opening toward each other, a pair of flanged members connecting said arch beams and extending between the flanges thereof, and a cover plate for said flanged members.

13. In a truck, the combination with a pair of spaced spring bolsters, of arch beams connecting the spring bolsters and comprising a pair of channel beams connected to said spring bolsters, a pair of flanged members connecting said channel beams, the web of each of the flanged members being bent into an engaging angle portion, means connecting each of such engaging angle portions to the respective web of the channel arch beams, and a cover plate for the flanged members.

14. In a truck, the combination with a pair of spaced spring bolsters, of arch bars, connecting said bolsters, and comprising a pair of pressed channels disposed longitudinally with respect to the truck, a pair of transversely disposed channels spaced apart and connecting the longitudinal channel arch beams and extending between the flanges thereof and a cover plate for the transverse channels.

15. In a truck, the combination with a pair of spaced spring bolsters, of arch bars, connecting said bolsters and comprising a pair of channels disposed longitudinally with respect to the truck, a pair of transversely disposed flanged members spaced apart and connecting the longitudinal arch beams and extending between the flanges thereof, and a cover plate for the transverse flanged members, also extending between the flanges of the arch beams.

16. In a truck, the combination with a pair of spaced spring bolsters, of arch bars connecting said bolsters and comprising a pair of channel members disposed longitudinally with respect to the truck, a pair of transversely disposed flanged members connecting the longitudinal arch bars and extending between the flanges thereof, means connecting the flanges of the said flanged members to the flanges of the arch bars, and a cover plate for the transversely disposed flanged members lapping the flanges of the longitudinally disposed arch bars, and means connecting said cover plate to said channel beams.

17. In a truck, the combination with a pair of spaced spring bolsters, of arch bars, connecting the same and comprising a pair of channel beams disposed longitudinally with respect to the truck, a pair of channels spaced apart and disposed transversely with respect to the arch bar channel beams, the ends of the transversely disposed channels extending between the flanges of the arch bars, a filler block between the transversely disposed channels at each end thereof, means connecting said blocks to said transversely disposed channels, means connecting said blocks to the arch bars, and a cover plate for the transversely disposed channels.

18. In a truck, the combination with a pair of spaced spring bolsters, of arch bars, connecting said bolsters, and comprising a pair of channel beams disposed longitudinally with respect to the truck, a pair of spaced flanged members disposed transversely of the arch bars and extending between the flanges thereof, a pressing filler block between the transversely disposed flanged members at each end thereof comprising a web, a flange at each side of said web, and top and bottom flanges, means connecting the side flanges of each filler block to the webs of the transversely disposed flanged members, and means connecting the top and bottom flanges of each filler block to the flanges of the respective arch bar.

19. In a truck, the combination with a pair of spaced spring bolsters, of arch bars connecting said bolsters and comprising a pair of channel members disposed longitudinally with respect to the truck, and each tapering vertically from an intermediate point, a short bolster disposed transversely with respect to the arch bars and extending between the flanges thereof, a cover plate for said short bolster, and a filler block between each end of the cover plate and the contiguous flange of the respective arch bar.

20. In a truck, the combination of a pair of spring bolsters each comprising a pair of channel beams and top and bottom cover plates, arch bars connecting said spring bolsters, and having their ends resting upon said spring bolsters, and a filler block within each spring bolster beneath each end of the arch bars.

21. In a truck, the combination, of a pair of spring bolsters, each comprising a pair of spaced channel beams and top and bottom cover plates therefor, arch bars mounted upon and connecting said bolsters, a filler block pressing within each spring bolster beneath each end of said arch bars, each filler block pressing having a cross web and top and bottom and side flanges, means connecting the side flanges of each filler block pressing to the webs of the respective spring bolster channels, means connecting the bottom flange of each filler block pressing to the bottom cover plate of the respective bolster members, and means connecting the top flange of each filler block pressing to the top cover plate of the respective bolster, and to the respective arch bar.

22. In a truck, a spring bolster comprising a pair of spaced channels, each formed with a reduced portion for a portion of its length, top and bottom cover plates extending throughout the length of the channels, a filler block between the channels contiguous to the reduced portion, and means connecting the ends of the filler block to the respective channels.

23. In a truck, a spring bolster comprising a pair of spaced channels, each formed with a part of the upper portion cut away leaving a shouldered portion intermediate its length, a cover plate extending throughout the length of the channels, said cover plate being bent about the shouldered portion, a filler block pressing disposed between the channels contiguous to the shouldered portion, said pressing comprising a cross web extending from one channel to the other, an attaching flange at each end of the web and outstanding flanges extending from said end flanges outwardly between the cover plate and the edge of the shouldered portion of the channels, means connecting the end flanges to the channels, and means connecting the outstanding flanges to the cover plate.

24. In a truck, a spring bolster comprising a pair of spaced channel beams with outstanding flanges, a portion of each channel being cut away at each end longitudinally, a portion of the remaining web at each cut away portion being bent to form an outstanding flange, a bottom cover plate extending throughout the length of the channels and connected to the lower flanges thereof, and a top cover plate extending throughout the length of the channels, being bent into a shouldered portion at the cut away portion and being connected to the upper flanges throughout the length of the beams.

25. In a truck, a spring bolster comprising a pair of spaced channel beams, top and bottom cover plates extending throughout the length of the beams and connected to the flanges thereof, elliptical spring band seat blocks extending across and beneath the bottom cover plate, an upstanding lug from each of said seat blocks extending through the bottom cover plate, and means connecting the ends of each of said seat blocks to the flanges of the channel beams.

26. In a truck, the combination with side frames and transoms connecting the same, of spring plank hangers depending from said transoms, connecting pins for said hangers, a bearing block for each of said pins, and a spring plank mounted on said bearing blocks and having a retaining cap for each bearing block engaging the edges thereof for retaining the blocks against independent lateral play.

27. In a truck, the combination with spring plank hangers and connecting pins therefor, of a bearing block journaled on each of said pins, a cap detachably resting upon each of the bearing blocks and having depending flanges overhanging the edges of said blocks disposed for preventing independent lateral play of the blocks, and a spring plank rigidly connecting said caps.

28. In a truck, the combination with spring plank hangers and connecting pins therefor, of a bearing block journaled on each of said pins and having a depression in its upper face, a spring-band seat for each of said blocks having an extension projecting into the recess of the respective block, and a spring plank connecting said spring-band seats.

29. In a truck, the combination with spring plank hangers and connecting pins therefor, of a bearing block journaled on each of said pins, a cap engaging each block for preventing independent lateral play thereof, a spring plank connecting the caps, and a spring-band seat mounted on each cap.

30. In a truck, the combination with spring plank hangers and connecting pins therefor, of a bearing block journaled on each of said pins, a cap detachably engaging each of said blocks for preventing independent play thereof, a spring plank fixed to and connecting said caps, and a spring-band seat fixed to each cap.

31. In a truck, the combination with spring plank hangers and connecting pins therefor, of a bearing block journaled on each of said pins, a cap detachably engaging each of said blocks for preventing independent play thereof, each block having a depression in its upper face and each cap having a corresponding registering aperture, a spring plank connecting said caps, a spring-band seat mounted upon each cap and having a depending portion extending through said aperture and into said recess and means connecting said caps and seats to the spring plank.

32. In a truck, the combination with spring plank hangers and pins connecting the same, of a bearing block journaled on each of said pins, a cap engaging each block and retaining the same against independent play, a spring plank connecting said caps and comprising a pair of flanged beams each having a flange mounted upon the caps, a spring-band seat for each cap mounted upon the respective cap between the flanges of the spring plank beams and overlying the flanges of said beams, and means connecting each spring-band seat to the beams and to the respective cap.

33. In a truck, the combination of a pair of spaced beams comprising a side frame, a pair of pedestals depending from the side frame, a filler block between the beams above the pedestals, and bolts engaging the pedestals and extending upwardly through said filler block and between the beams and sustained by the beams.

34. In a truck, the combination of a pair of beams comprising a side frame, a beam comprising an end frame, one of the first mentioned beams being bent at its end portion into a portion lapping the end frame, means connecting the end of the other beam of the side frame with the lapping portion, and means connecting the lapping portion to the end frame.

35. In a truck, the combination of a pair of channel beams, comprising a side frame, a beam, comprising an end frame, the beams of the side frame lying both in the same horizontal planes, the outer of the side frame beams being bent at its end portion past the end of the inner of the side frame beams into a portion lapping the end frame, the flanges of the inner side frame beam being cut away at the end, and means connecting the webs of the side frame beams together.

36. In a truck, the combination of a pair of channel beams opening toward each other and comprising a side frame, and a beam, comprising an end frame, the beams of the side frame lying both in the same horizontal planes, and the outer of the side frame beams being bent at its end portion past the end of the inner beam of the side frame into a portion lapping the end frame, the inner beam of the side frame having its flanges cut away to accommodate the flanges of the bent portion of the outer beam, and the web of the inner beam extending between the flanges of said bent portion of the outer beam.

37. In a truck, the combination of a pair of channel beams opening toward each other and comprising a side frame, a beam, comprising an end frame, the outer of the side frame beams being bent at its end portion past the end of the inner beam of the side frame, and the flanges of the inner beam being cut away to accommodate the flanges of the bent portion of the outer beam, the web of the inner beam extending between the flanges of the bent portion of the outer beam, and means connecting said web to the web of the outer beam, said bent portion of the outer beam being formed into a portion lapping the end frame.

38. In a truck, the combination of a pair of beams comprising a side frame, an end frame, one of the beams of the side frame being bent past the end of the other and forming a portion lapping the end frame, means connecting the lapping portion to the end frame, and means engaging said connecting means adapted to connect the end of one of the side frame beams to the other side frame beam.

39. In a truck, the combination of a pair of beams comprising a side frame, an end frame, one of the beams of the side frame being bent past the other and forming a portion lapping the end frame, and means connecting the beams of the side frame together within the bend of said side frame beam.

40. In a truck, the combination of a pair of beams comprising a side frame, an end frame, one of the beams of the side frame being bent past the other and formed into a portion lapping the end frame, and a gusset plate interposed between the lapping portions and connected to the lapping portion and to the main portion of the bent beam and also connected to the other beam of the side frame.

41. In a truck, the combination of a pair of beams comprising a side frame, an end frame, one of the side frame beams being bent past the other and formed into a portion lapping the end frame, and a gusset plate disposed between the end frame upon the upper side thereof and lapping portion and to the connected to said end frame and lapping portion and to the side frame upon the under side thereof.

42. In a truck, the combination of a pair of beams comprising a side frame, an end frame, one of the beams of the side frame being bent past the other and formed into a lapping portion overhanging the end frame, a gusset plate lying upon the end frame and beneath the lapping portion and extending beneath the side frame, and means connecting said gusset plate to the side and end frames.

43. In a truck, the combination of a pair of beams comprising a side frame, and end frame, one of the side frame beams being bent past the other and formed into a portion overlapping the end frame, a gusset plate mounted upon the end frame and disposed beneath the lapping portion and extending beneath both beams of the side frame, means connecting the end frame and lapping portion to the gusset plate, and means connecting the gusset plate to both of the beams of the side frame.

44. In a truck, the combination of a pair of beams comprising a side frame, an end frame, one of the beams of the side frame being bent past the other and formed into a portion lapping the end frame, a gusset plate overlying and connecting the lapping portion to the side frame, and a gusset plate underlying and connecting the lapping portion to the side frame.

45. In a truck, the combination of a pair of beams comprising a side frame, and end frame, one of the side frame beams being bent past the other and formed into a portion lapping the end frame, a truss rod for the side frame, and means connecting the truss rod, end frame and bent beam together.

46. In a truck, the combination of a pair of beams comprising a side frame, a truss rod for said side frame, a flanged beam comprising an end frame, one beam of the side frame being bent past the other and formed into a portion lapping the end frame, means connecting one of the flanges of the end frame beam to the truss rod, and means connecting the other flange of the end frame beam to the bent beam of the side frame.

47. In a truck, the combination, with a side frame, of a truss rod therefor comprising a flanged beam, an end frame comprising a flanged beam, means connecting one flange of the end frame beam to one flange of the truss rod, means connecting the other flange of the end frame beam to the other flange of the truss rod, and means connecting the end frame to the side frame.

48. In a truck, the combination of a pair of channel beams comprising a side frame, an end frame, one of the side frame beams being bent past the other into a portion lapping the end frame, the flanges of the other beam being cut away to accommodate the flanges of the bent portion and the web of said other beam extending between the flanges of the bent portion, and an angle bracket connecting said web with the web of the bent portion.

49. In a truck, the combination of a pair of beams comprising a side frame, a flanged pedestal tie rod therefor, one of the side frame beams being bent past the other, and one of the flanges of the tie rod lying being beneath the bent portion, a flanged beam comprising an end frame and having one of its flanges bent into engagement with one of the flanges of the tie rod, means securing the two last-mentioned flanges together, the other flange of the end frame beam lapping the other flange of the tie rod, and means connecting the two last-mentioned flanges together and to the side frame.

50. In a truck, the combination with a side frame, of a pedestal tie rod therefor comprising a beam having a vertical flange and a horizontal flange, an end frame comprising a beam having a vertical flange and a horizontal flange, the vertical flange of the end frame beam being bent at the end into engagement with the vertical flange of the tie rod, and the horizontal flange of the end frame beam lapping the horizontal flange of the tie rod, means connecting the vertical flanges of the tie rod and end frame beam together, and means connecting the horizontal flanges of the tie rod and end frame beam to the side frame.

51. In a truck, the combination of a pair of beams comprising a side frame, an end frame, one of the side frame beams being bent past the other into a portion lapping the end frame, a pedestal tie rod for the side frame, the end frame having a flange lapping the tie rod, and means connecting said flange, tie rod and bent portion of the side frame beam together.

52. In a truck, the combination with an end frame, a side frame having a portion bent to lap the end frame, a gusset plate between the side frame lapping portion and the end frame and terminating short of the said lapping portion, a brake release spring extending between said lapping portion and the end frame, means securing the release spring, lapping portion and the end frame together, a tie beam extending to the end frame, and means connecting said release spring to said tie beam.

53. In a truck, the combination of a side frame, a transom connected thereto, an end frame connected to the side frame, said side frame having a portion bent to a position parallel with said end frame, a tie beam connected at one end to the transom and at the other end to the end frame, and means connecting said tie beam to said end frame and to the bent portion of the side frame.

54. In a truck, the combination of a side frame, a transom connected thereto, an end frame connected to the side frame, said side frame having a portion bent to a position parallel to said end frame, a tie beam connected at one end to the transom and at the other end to the end frame, a brake-release spring extending between the bent portion of the side frame and the end frame, means securing said bent portion, release spring and end frame together, and means connecting said release spring to said tie beam.

55. In a truck, the combination of a pair of channel beams comprising an end frame, a beam comprising a side frame, one of the channel beams being bent past the end of the other to a position parallel with and lapping said end frame beam, the upper flange of the bent channel beam terminating short of the lower flange thereof and the web thereof being inclined substantially from one flange to the other, and means securing the lapping portion and end frame together.

56. In a truck, the combination of side frames, each comprising a pair of spaced beams, transoms connecting the side frames, and a filler block between the beams of each side frame extending from one transom to the other.

57. In a truck, the combination with side frames, each comprising a pair of spaced beams and a pair of transoms connecting the side frames, of a filler block between the beams of each side frame, means connecting one transom to the filler blocks, and means suspending the other transom from the filler blocks.

58. In a truck, the combination of side frames, each comprising a pair of channel beams opening toward each other, a pair of transoms connecting the side frames, a filler block snugly fitting between the flanges of the channel beams of each side frame and extending from one transom to the other, means connecting the filler blocks to the webs of the respective side frame beams, means connecting the filler blocks to the flanges of the respective side frame beams and means connecting the transoms to the filler blocks.

59. In a truck, the combination of side frames, each comprising a pair of channel beams opening toward each other, a pair of transoms connecting the side frames, a filler block snugly fitting between the beams of each side frame and extending from one transom to the other, means connecting the filler blocks to the webs of the respective side frame beams, means connecting one of the transoms to the filler blocks, and means connecting the other transom to the filler blocks and webs of the side frame beams.

60. In a truck, the combination of side frames, each comprising a pair of spaced beams, a pair of transoms connecting the side frames, one transom being disposed higher than the other, a filler block between each pair of side frame beams and extending from one transom to the other, means connecting the higher transom to the filler blocks, and means suspending the lower transom from the filler blocks.

61. In a truck, the combination of side frames, each comprising a pair of spaced beams, a pair of transoms connecting the side frames, one transom being disposed higher than the other, a filler block between the beams of each pair of side frame beams and extending from one transom to the other, means connecting the higher transom to the filler blocks, and bolts engaging and extending upwardly from the lower transom into engagement with the filler blocks.

62. In a truck, the combination of side frames, each comprising a pair of spaced flanged beams, a pair of transoms connecting the side frames, one transom being disposed higher than the other, a filler block between the beams of each pair of side frame beams and extending from one transom to the other, means connecting the higher transom to the filler blocks, and bolts engaging and extending upwardly from the lower transom into engagement with the filler blocks and the flanges of the side frame beams.

63. In a truck, the combination of a side frame, a member connected thereto, and having a laterally extending flanged portion, and a lug upstanding from the flanged portion, and a transom mounted on said flanged portion and having a portion interlocking with said lug.

64. In a truck, the combination of a side frame, a member connected thereto and having a laterally extending flange portion and a lug upstanding from the flange portion, a transom mounted on said flange portion and having a portion interlocking with said lug, and means connecting the transom to the side frame.

65. In a truck, the combination with a side frame, a member connected thereto and having a laterally extending flange portion and a lug upstanding from the flange portion, and a transom mounted on said flange portion and formed to surround the lug.

66. In a truck, the combination of a side frame, a member connected thereto and having a laterally extending flange portion and a lug upstanding from the flange portion, and a transom mounted on said flange portion and comprising a pair of beams and a filler block therebetween formed with a lug interlocking with the first-mentioned lug.

67. In a truck, the combination, with a side frame, of a member connected thereto and having a portion projecting laterally beyond the side frame and formed with an upstanding lug, and a transom having its end mounted upon said laterally projecting portion, and having a portion extending between the lug and the side frame.

68. In a truck, the combination, with a side frame, of a member connected thereto and having a portion projecting laterally beyond the side frame and formed with an upstanding lug, a transom having its end mounted upon said laterally projecting portion and having a portion extending between the lug and the side frame, and means connecting the transom to the side frame.

69. In a truck, the combination, with a side frame, of a member connected thereto and having a portion projecting laterally beyond the side frame and formed with an upstanding lug, a transom having its end mounted upon the said laterally projecting portion and having a portion extending between the lug and the main body of said member.

70. In a truck, the combination with an equalizer spring cap, of a block mounted thereon, a side frame resting on said block, a transom mounted on the block, and means connecting the transom to the block.

71. In a truck, the combination with an equalizer spring cap, of a block mounted thereon, a side frame resting on said block, a transom mounted on the block, means connecting the transom to the block, and means connecting the transom to the side frame.

72. In a truck, the combination with an equalizer spring cap, of a block mounted thereon, a side frame resting on said block, a transom mounted on the block, means connecting the transom to the block, and means connecting the cap, block and side frame together.

73. In a truck, the combination with an equalizer spring cap, of a block mounted thereon, a side frame resting on said block, said block having a lateral flange, a transom mounted on the flange, and means connecting the transom to the flange.

74. In a truck, the combination with an equalizer spring cap, of a block mounted thereon, a side frame resting on said block, said block having a lateral flange, a transom mounted on the flange, and means connecting the transom to the side frame.

75. In a truck, the combination with an equalizer spring cap, of a block mounted thereon, a side frame resting on said block, said block having a lateral flange, a transom mounted on the flange, means connecting the transom to the flange, and means connecting the transom to the side frame.

76. In a truck, the combination with an equalizer spring cap, of a block mounted thereon, a side frame resting on said block, and comprising a pair of spaced beams and a filler block therebetween and disposed above the first-mentioned block, means connecting the blocks, beams and cap together, said first-mentioned block having a laterally extending portion, a transom comprising a pair of spaced beams mounted on said laterally extending portion, a filler block between the transom beams engaging said laterally extending portion, and means connecting the last-mentioned filler block to the transom beams.

77. In a truck, the combination of a pair of spaced beams comprising a transom, a filler block disposed between the beams and having a pair of parallel webs, means retaining the filler block in position between the beams, and a spring plank hanger pivoted between the webs of the filler block.

78. In a truck, the combination with a side frame, of a pair of spaced beams comprising a transom, a filler block disposed between the beams and having a pair of parallel webs, means connecting the filler block to the side frame, and a spring plank hanger pivoted between the webs of the filler block.

79. In a truck, the combination of a pair of spaced beams comprising a side frame, a pair of transoms connected to the side frame, a filler block between the side frame beams extending from one transom to the other, a gusset plate connected to and extending from one transom to the side frame, and means connecting said gusset plate to the side frame and filler block.

80. In a truck, the combination of a pair of spaced beams comprising a side frame, a pair of transoms connected to the side frame, a filler block between the side frame beams extending from one transom to the other, a gusset plate connected to one transom and extending toward the other transom along the side frame, and means connecting said gusset plate to the side frame and filler block.

81. In a truck, the combination with a side frame, of a transom extending below the same, a bracket disposed in the corner between the transom and side frame and resting on the transom, means connecting the bracket to the side frame, and a spring plank hanger journaled on the bracket.

82. In a truck, the combination of a side frame, a transom connected thereto, a casting mounted on the transom, means connecting the casting to the side frame, and a spring plank hanger journaled in said casting.

83. In a truck, the combination of a side frame, a transom connected thereto, said transom comprising a pair of spaced beams, a casting mounted on the transom, means connecting the casting to the side frame, and a spring plank hanger journaled in the casting and depending between the beams of the transom.

84. In a truck, the combination of a side frame, a transom connected thereto, a casting mounted on the transom and having a pair of spaced webs, means connecting the casting to the side frame, and a spring plank hanger extending between and journaled in the webs of the casting.

85. In a truck, the combination of a side frame, a pair of spaced beams comprising a transom, a casting mounted on the beams and having a pair of spaced webs disposed with the space therebetween in alinement with the space between the beams, means connecting the casting to the transom, and a spring plank hanger extending between the beams and webs and journaled in the casting.

86. In a truck, the combination of a pair of beams comprising a transom, a casting sustained thereby and having a lug projecting between and spacing the beams, and a spring plank hanger extending between the beams and journaled in the casting.

87. In a truck, the combination with a side frame, of a pair of spaced beams comprising a transom, a corner bracket connected to the side frame and to the transom, and a spacing lug extending from the bracket between the transom beams.

88. In a truck, the combination with a side frame, of a pair of spaced beams comprising a transom, a bracket connected to the side frame, a lug depending from the bracket between and spacing the beams of the transom, and means connecting the lug to the transom beams.

89. In a truck, the combination with side frames, of transoms connecting said side frames, one of the transoms being higher than the other, a horizontal bolt connecting each end of the higher transom to the respective side frame, and vertical bolts connecting the lower transom to the side frames.

90. In a truck, the combination of side frames, each comprising a pair of beams, transoms connecting said side frames, a filler block between the beams of each side frame, extending from one transom to the other, horizontal bolts connecting one of the transoms to the side frames and filler blocks, and vertical bolts connecting the other transom to the side frames and filler blocks.

91. In a truck, the combination with side frames and equalizer springs for sustaining the same, of transoms connecting said side frames, one of said transoms lying in substantially the same transverse planes of the truck with the equalizer springs, and the other transom being spaced therefrom, each of said side frames comprising a pair of spaced beams, a filler block extending between each pair of side frame beams from one transom to the other, means connecting each filler block to its respective side frame beams at that end contiguous to the equalizer spring, means at an intermediate point of each filler block and at intervals therefrom in the length of the block to the end thereof farthest from said equalizer spring securing the filler block to the side frame beams, and means connecting said transoms to said side frames.

92. In a truck, the combination of a pair of channel beams opening toward each other and comprising a side frame, a pair of spaced channel beams opening away from each other and comprising a transom extending beneath the side frame, a filler block disposed between the beams of the side frame, a plate extending transversely of and beneath the transom, and bolts extending through the ends of said transverse plate and through the flanges of the transom beams and upwardly between the flanges of the side frame beams and through said filler block.

93. In a truck, the combination, with side frames, of transoms connecting the same, one being disposed higher than the other, and each comprising a pair of beams, a spring plank hanger extending between and journaled in the beams of the higher transom, a coöperating hanger extending between the beams of the lower transom, and a journal bearing for the second-mentioned hanger sustained by the lower transom in the same horizontal planes as the bearing for the first-mentioned hanger.

94. In a truck, the combination of side frames, two pairs of transoms spaced apart and connecting the side frames, a spring bolster disposed between the transoms of each pair, arch bars connecting said spring bolsters, and a tie bar connecting the inner transom of one pair with the inner transom of the other pair.

95. In a truck, the combination of side frames, two pairs of transoms spaced apart and connecting the side frames, and a tie bar at each side of the truck connecting the inner transom of one pair with the inner transom of the other pair.

96. In a truck, the combination of side and end frames, two pairs of transoms spaced apart and connecting the side frames, a tie bar connecting the inner transom of one pair with the inner transom of the other pair, and a tie bar for each end frame connecting the respective end frame with the outer transom of the respective pair.

97. In a truck, the combination with an axle, side frames sustained thereby, and a pair of transoms connecting the side frames at each side of the axle, of a tie bar connecting the inner transom of one pair with the inner transom of the other pair, and a safety hanger yoke depending from said tie bar about said axle.

98. In a truck, the combination of a pair of beams comprising a transom, a brake hanger bearing, a web extending from said bearing between the beams of the transom and means formed upon said bearing adapted to engage a vertical outside portion of one of said beams.

99. In a truck the combination of a pair of beams comprising a transom, a brake hanger bearing, a sustaining web therefor extending between the transom beams and being connected to one of said beams, and means formed upon said bearing adapted to engage a top surface portion of one of said beams.

100. In a truck, the combination of a pair of flanged beams comprising a transom, a brake hanger bearing, a sustaining web therefor of angular cross section engaging the web and flange of one of the transom beams, and a hook extending from the bearing sustaining web and overhanging said last-mentioned flange.

101. In a truck, the combination of a pair of beams comprising a transom, a web extending between the beams and connected to one of the beams, a brake hanger bearing depending from said web, and a spring plank hanger extending past the web and between the beams.

102. In a truck, the combination of a pair of flanged beams comprising a transom, a brake hanger bearing engaging and depending from the flange of one of the beams, ears extending laterally from said bearing, and means connecting said ears to the flange.

103. In a truck, the combination of a pair of flanged beams comprising a transom, a brake hanger bearing engaging the under surface of the flange of one of said beams and depending therefrom, ears extending laterally from said brake hanger bearing, means connecting said ears to said flange, a web upstanding from said bearing, and means connecting said web to the web of that beam whose flange is engaged by said ears.

104. In a truck, an arch bar comprising a channel having its flanges tapering longitudinally in one direction and a web tapering longitudinally in the opposite direction.

105. In a truck, an arch bar comprising a channel having its flanges tapering toward an intermediate point and its web tapering from said intermediate point.

106. In a truck, an arch bar comprising a channel having its flanges tapering longitudinally from both end portions toward an intermediate point and its web tapering in both directions longitudinally from said intermediate point.

In witness whereof, I have hereunto set my hand in the presence of two witnesses.

JAMES G. LAWLER.

Witnesses:
B. H. DYER,
VIC. D. DIERKER.